(12) United States Patent
Miyakoshi

(10) Patent No.: US 8,699,099 B2
(45) Date of Patent: Apr. 15, 2014

(54) DOCUMENT CONVEYING DEVICE HAVING CLAWED ELASTIC PORTIONS AND A SUPPORT PORTION WITH A GUIDE PORTION PROTRUDING DOWNWARD BETWEEN THE ELASTIC PORTIONS, IMAGE READING DEVICE INCLUDING THE DOCUMENT CONVEYING DEVICE, AND IMAGE FORMING APPARATUS

(75) Inventor: Naoto Miyakoshi, Osaka (JP)

(73) Assignee: Kyocera Document Solutions, Inc., Osaka (JP)

( * ) Notice: Subject to any disclaimer, the term of this patent is extended or adjusted under 35 U.S.C. 154(b) by 595 days.

(21) Appl. No.: 13/013,152

(22) Filed: Jan. 25, 2011

(65) Prior Publication Data

US 2011/0235137 A1  Sep. 29, 2011

(30) Foreign Application Priority Data

Mar. 26, 2010  (JP) .................................. 2010-071673

(51) Int. Cl.
*H04N 1/04* (2006.01)
(52) U.S. Cl.
USPC .......... 358/498; 358/474; 358/496; 271/3.01; 271/3.14; 271/3.19
(58) Field of Classification Search
None
See application file for complete search history.

(56) References Cited

U.S. PATENT DOCUMENTS 5,338,018 A * 8/1994 Nagao et al. .................. 271/3.05
5,453,852 A * 9/1995 Morikawa et al. ............ 358/498
7,490,824 B2  2/2009 Kakuta
2005/0163546 A1 * 7/2005 Kim ............................... 399/367
2007/0069445 A1 * 3/2007 Kakuta ......................... 271/3.14

FOREIGN PATENT DOCUMENTS

| JP | 2002-14495 |   | 1/2002 |
|----|------------|---|--------|
| JP | 2007-124621 |   | 5/2007 |
| JP | 2008-3212 |   | 1/2008 |
| JP | 2008003212 A | * | 1/2008 |
| JP | 2009-89216 |   | 4/2009 |

* cited by examiner

*Primary Examiner* — Miya J Cato
(74) *Attorney, Agent, or Firm* — Smith, Gambrell & Russell, LLP

(57) ABSTRACT

Provided is a document conveying device, including: a conveyance guide member which is capable of being opened upward and closed with respect to a contact glass, disposed facing the contact glass along a conveying direction of a document, and guides the document to an upper surface of the contact glass; a reading guide member which is disposed along a width direction of the document, movably supported in an up-and-down direction with respect to the conveyance guide member, and guides the document to a position facing an image reading region in the upper surface of the contact glass; a protruding portion which is protruded outward from at least one end portion of the reading guide member in the width direction; a support portion which is protruded outward from the conveyance guide member along the width direction above the protruding portion; and elastic portions which are protruded downward from the support portion and sandwich the protruding portion so that the protruding portion is movable in the up-and-down direction, each of the elastic portions having a tip end including a claw portion which engages with the protruding portion from below by snap-fitting so as to enable regulation of downward movement of the protruding portion.

5 Claims, 8 Drawing Sheets

DOCUMENT CONVEYING DEVICE HAVING CLAWED ELASTIC PORTIONS AND A SUPPORT PORTION WITH A GUIDE PORTION PROTRUDING DOWNWARD BETWEEN THE ELASTIC PORTIONS, IMAGE READING DEVICE INCLUDING THE DOCUMENT CONVEYING DEVICE, AND IMAGE FORMING APPARATUS

This application is based upon and claims the benefit of priority from the corresponding Japanese Patent Application No. 2010-71673 filed on Mar. 26, 2010, the entire contents of which are incorporated herein by reference.

BACKGROUND OF THE INVENTION

1. Field of the Invention

The present invention relates to an image reading device that scans and reads a document, for use in a digital copier, an image scanner, and the like, and an image forming apparatus including the image reading device. In particular, the present invention relates to a sheet-through type image reading device including a document conveying device, which conveys a document and reads an image.

2. Description of Related Art

Conventionally, there is known an image reading device mounted on a multifunction peripheral or the like employing an electrophotographic process, which includes a document conveying device (automatic document feeder) which sequentially feeds sheet-shaped documents to a document placing table so as to read the documents and discharges the documents from the document placing table after finishing reading the documents. In such an image reading device, two kinds of reading systems may be employed, that is, a sheet-through system in which a document is automatically conveyed by the document conveying device and read with a document holder being closed, and a document fixing system in which the document holder is opened/closed for each reading so as to replace a document on the document placing table (contact glass) one by one, and an optical system (scanning means) is moved to read the document. Note that, according to the former sheet-through system, a reading operation of the document is performed under a state in which the optical system in the image reading device is held at a predetermined image reading position without being moved for scanning. On the other hand, according to the latter document fixing system, the reading operation is performed under a state in which the optical system therein is moved for scanning.

In an image reading device capable of performing reading with such a sheet-through system, conventionally, the document conveying device includes a conveyance guide which is disposed above the contact glass. Further, a reading guide is supported on the conveyance guide at a position facing an image reading region. After the document is guided along the conveyance guide, the document passes through a gap between the reading guide and the contact glass. After the document passes through the gap, the document is further guided to a downstream side by the conveyance guide. Then, the document is discharged to a document discharge tray.

FIG. 8 illustrates an example of a conventional conveyance guide and a conventional reading guide described above. FIG. 8 is a view illustrating a support state of a conventional first reading guide 83 with respect to a conventional first conveyance guide 81. As illustrated in FIG. 8, at an end portion of the first conveyance guide 81 on a front surface side (front side of FIG. 8) in a direction perpendicular to a document conveying direction (direction of the arrow illustrated in FIG. 8), a first support portion 81a is provided so as to protrude to the front surface side.

At an end portion of the first reading guide 83 on the front surface side, a first protruding portion 83a is provided so as to protrude to the front surface side below the first support portion 81a. In the first protruding portion 83a, an attachment screw 91 is allowed to pass therethrough upwardly from below in a slidable manner. A screw portion at a tip end of the attachment screw 91 is screwed into the first support portion 81a.

A stop ring 93 is mounted to the attachment screw 91 at an upper side of a screw head with a predetermined gap therefrom. The first protruding portion 83a is slidable in an up-and-down direction between the screw head of the attachment screw 91 and the stop ring 93. Further, between the first support portion 81a and the first protruding portion 83a, a first coil spring 85 is disposed so as to surround a peripheral surface of the attachment screw 91. The first coil spring 85 biases the first protruding portion 83a in a direction separating from the first support portion 81a (lower side of FIG. 8).

With this structure, when the document conveying device (not shown) is opened or closed with respect to the contact glass (not shown), and accordingly the first reading guide 83 is separated from or brought into abutting contact with the contact glass (not shown), the first reading guide 83 moves in the up-and-down direction with respect to the first conveyance guide 81. Technologies described below are technologies for supporting the reading guide so that the reading guide is movable in the up-and-down direction with respect to the conveyance guide as described above.

For example, in a first related art, a reading guide member is supported by a main body (conveyance guide member) at two support portions on a front surface side and a back surface side, respectively. Specifically, the support portion on the back surface side supports the reading guide member so that the reading guide member is displaceable in an approaching/separating direction with respect to a contact glass, while causing the reading guide member to be biased toward the contact glass by a bias member. In addition, the support portion on the front surface side supports the reading guide member so that the reading guide member is displaceable in the approaching/separating direction with respect to the contact glass, within a smaller range than that of the support portion on the back surface side.

In the first related art described above, an attachment screw, which is allowed to pass through a through hole of the reading guide member upwardly from below, is screwed into a screw hole provided in the conveyance guide. In this manner, the reading guide member is supported by the conveyance guide member.

Further, in a second related art, a guide member (reading guide member) is disposed so that an upstream side thereof in a document conveying direction is swingable in the up-and-down direction, with a shaft, which is disposed in a support guide member (conveyance guide member) on a downstream side with respect to an image reading position, as a fulcrum. In addition, by a compression spring, the guide member is biased toward the contact glass with the above-mentioned shaft as a fulcrum.

In the second related art described above, an engaged pin, which is provided on the guide member so as to protrude axially outward therefrom, is inserted into a U-shaped engagement portion, which has both ends connected to the support guide member. In this manner, the guide member is supported by the support guide member on the upstream side of the above-mentioned shaft.

However, when the reading guide is supported by the conveyance guide with the use of the attachment screw as described in the first related art, the number of parts and assembly steps increase. Further, in a case where the pin formed in a horizontal direction slides in the up-and-down direction within the U-shaped engagement portion as described in the second related art, when the pin is disposed in an inclined state, the slidability in the up-and-down direction of the reading guide is reduced, and there is a risk of assembly failure. Further, in order to form the reading guide so as to be slidable in the up-and-down direction, other than the pin and the engagement portion, a swing pivot is also required to be formed.

SUMMARY OF THE INVENTION

In view of the above-mentioned problems, it is an object of the present invention to provide a document conveying device capable of achieving reduction in number of parts and labor saving during assembly, an image reading device including the document conveying device, and an image forming apparatus.

In order to achieve the above-mentioned object, a document conveying device according to an aspect of the present invention includes:

a conveyance guide member, which is capable of being opened upward and closed with respect to a contact glass, disposed facing the contact glass along a conveying direction of a document, and guides the document to an upper surface of the contact glass;

a reading guide member, which is disposed along a width direction of the document, movably supported in an up-and-down direction with respect to the conveyance guide member, and guides the document to a position facing an image reading region in the upper surface of the contact glass;

a protruding portion, which is protruded outward from at least one end portion of the reading guide member in the width direction;

a support portion, which is protruded outward from the conveyance guide member along the width direction above the protruding portion; and elastic portions, which are protruded downward from the support portion and sandwich the protruding portion so that the protruding portion is movable in the up-and-down direction, each of the elastic portions having a tip end including a claw portion which engages with the protruding portion from below by snap-fitting so as to enable regulation of downward movement of the protruding portion.

Further objects and advantages of the present invention will become apparent from the description of an embodiment given below.

DETAILED DESCRIPTION OF PREFERRED EMBODIMENT

Figure 1:
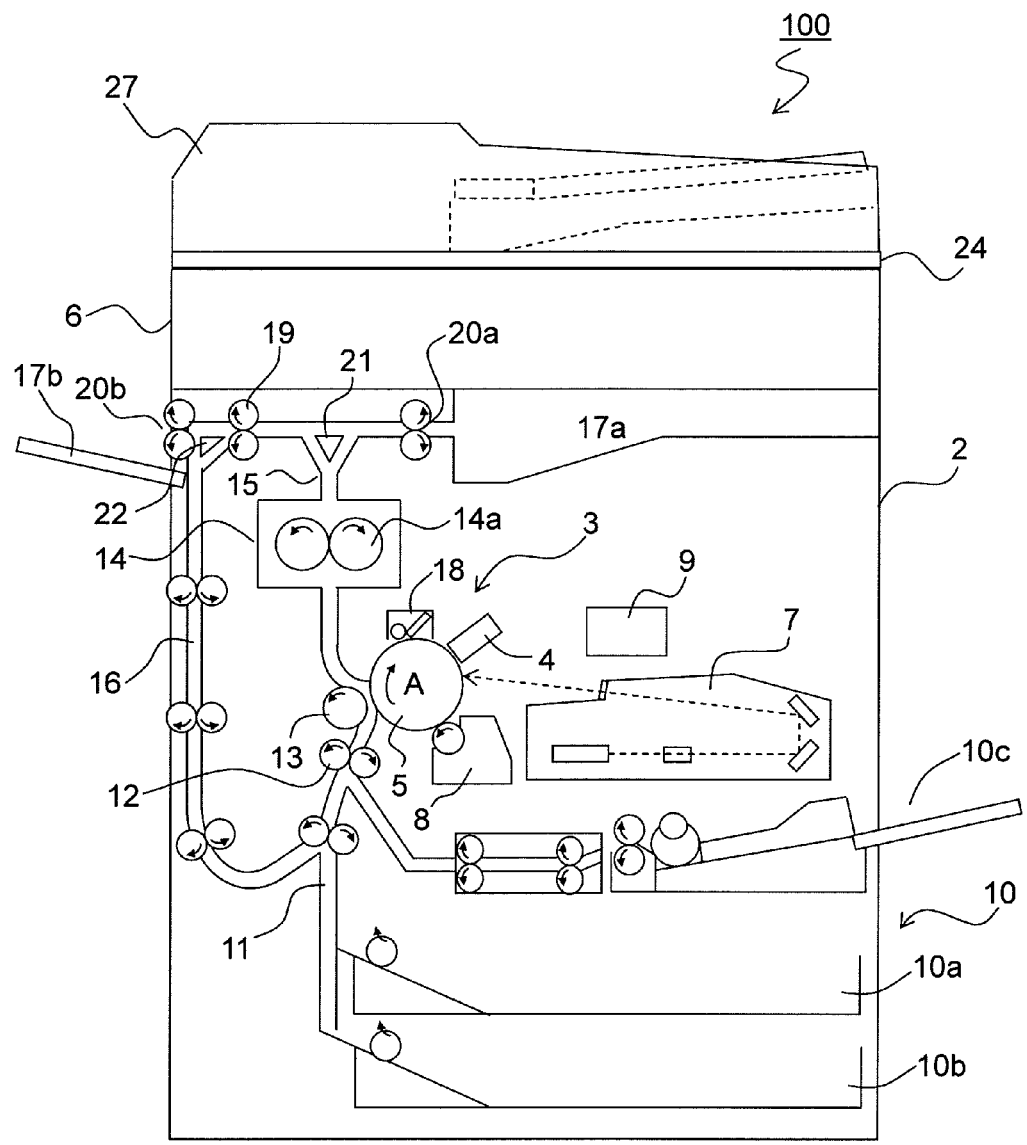
FIG. 1 is a sectional side view illustrating an overall structure of an image forming apparatus including a document conveying device according to an embodiment of the present invention.

Hereinafter, an embodiment of the present invention is described with reference to the drawings. FIG. 1 is a schematic structural view of an image forming apparatus including a document conveying device according to the embodiment of the present invention. In FIG. 1, when an image forming apparatus 100 (here, a digital multifunction machine is illustrated as an example) performs a copying operation, an image reading device 6 described later reads image data on a document and converts the image data into an image signal. Meanwhile, in an image forming portion 3 inside a multifunction peripheral main body 2, a photosensitive drum 5 that rotates in the direction of A of FIG. 1 is charged uniformly by a charging unit 4. Then, an electrostatic latent image is formed on the photosensitive drum 5 with a laser beam from an exposure unit (laser scanning unit or the like) 7, based on the document image data read in the image reading device 6. A developing unit 8 causes a developer (hereinafter, referred to as toner) to adhere to the electrostatic latent image, to thereby form a toner image. The toner is supplied to the developing unit 8 from a toner container 9.

A sheet is conveyed from a sheet feeding mechanism 10 to the image forming portion 3 via a sheet conveying path 11 and a registration roller pair 12 so that the sheet is conveyed toward the photosensitive drum 5 on which the toner image has been formed as described above. The toner image on the surface of the photosensitive drum 5 is transferred onto the sheet by a transfer roller 13 (image transfer portion) in the image forming portion 3. Then, the sheet onto which the toner image has been transferred is separated from the photosensitive drum 5 and conveyed to a fixing portion 14 including a fixing roller pair 14a so that the toner image is fixed thereon. The sheet having passed through the fixing portion 14 is sent to a sheet conveying path 15 branched in a plurality of directions, and then conveying directions of the sheet are sorted by path switching mechanisms 21 and 22 including a plurality of path switch guides provided at branching points of the sheet conveying path 15. The sheet is discharged to a sheet discharge portion including a first discharge tray 17a and a second discharge tray 17b directly (or after being sent to a sheet conveying path 16 for double-side copying).

Further, although not shown, a diselectrifying device for removing residual charges on the surface of the photosensitive drum 5 is provided on a downstream side of a cleaning device 18. Further, the sheet feeding mechanism 10 includes a plurality of sheet feeding cassettes 10a and 10b for storing sheets, which are detachably mounted to the multifunction peripheral main body 2, and a stack bypass (manual sheet feeding tray) 10c provided above the plurality of sheet feeding cassettes 10a and 10b. The plurality of sheet feeding cassettes 10a and 10b and the stack bypass 10c are connected to the image forming portion 3 including the photosensitive drum 5, the developing unit 8, and the like via the sheet conveying path 11.

The image reading device 6 is disposed in an upper portion of the apparatus main body. A platen (document holder) 24 pressing and holding a document placed on a contact glass 25 (see FIG. 2) of the image reading device 6 is provided in an openable and closable manner on an upper surface of the apparatus main body. A document conveying device 27 is provided on the platen 24.

Specifically, the sheet conveying path 15 is first branched into two paths of right and left on a downstream side of the fixing roller pair 14a, and one path (path branched in a right direction of FIG. 1) is communicated to the first discharge tray 17a. Meanwhile, another path (path branched in a left direction of FIG. 1) is branched into two paths via a conveying roller pair 19, and one path (path branched in the left direction of FIG. 1) is communicated to the second discharge tray 17b. In contrast, another path (path branched in a downward direction of FIG. 1) is communicated to the sheet conveying path 16.

Figure 2:
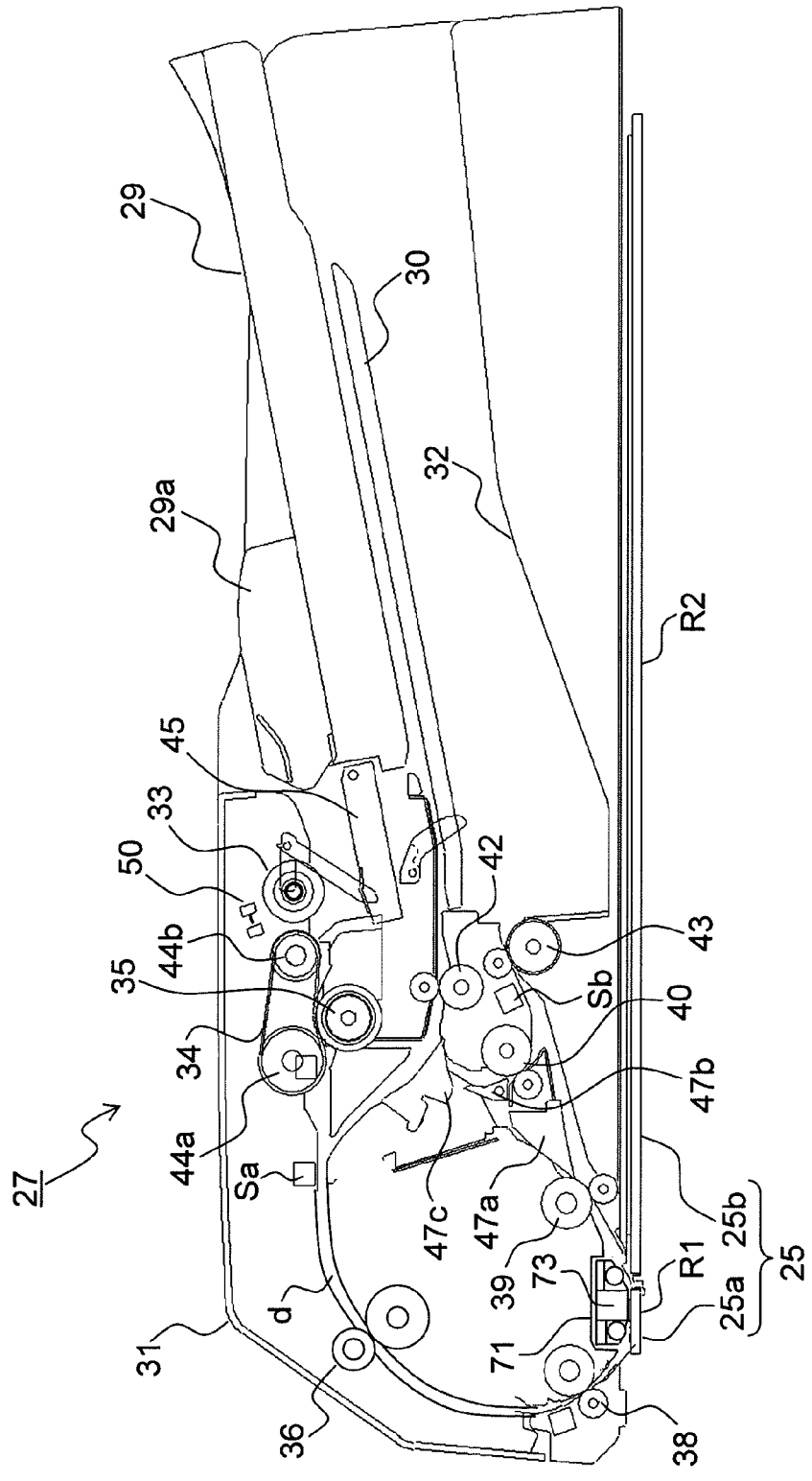
FIG. 2 is a sectional side view illustrating an internal structure around the document conveying device according to the embodiment of the present invention.

FIG. 2 is a sectional side view illustrating an internal structure around the document conveying device according to the embodiment of the present invention. The document conveying device 27 includes a document feeding tray 29 including a document guide 29a on which a plurality of documents are stacked in an aligned state, and an inversion tray 30 provided below the document feeding tray 29. The respective members of the document feeding tray 29 and the inversion tray 30 are mounted to a frame of the document conveying device 27. Further, a cover member 31 is supported by the frame of the document conveying device 27 in an openable and closable state with one end thereof (lower left of FIG. 2) as a rotary fulcrum. On a side of the cover member 31, a document discharge tray 32 is formed directly on a part of an upper surface of the platen 24. In the cover member 31, a document conveying path d extending from the document feeding tray 29 to the document discharge tray 32 is formed. By opening the cover member 31 and thereby opening the document conveying path d, jam clearance processing may be performed.

In the cover member 31, a document conveyance member is provided, the document conveyance member including, along the document conveying path d, a pickup roller 33, a sheet feeding belt 34, a separation roller 35, a registration roller pair 36, conveying roller pairs 38, 39, and 40, an inversion roller pair 42, and a discharge roller pair 43. The sheet feeding belt 34 is looped around a drive roller 44a and a driven roller 44b, and the separation roller 35 is brought into contact with the sheet feeding belt 34 from below with a predetermined pressure. A torque limiter is incorporated in the separation roller 35. Only in a case where a rotation load falls short of a predetermined torque, the separation roller 35 rotates in a direction opposite to that of the sheet feeding belt 34, and in a case where the rotation load exceeds the predetermined torque, the separation roller 35 rotates following the sheet feeding belt 34. An upper surface detection sensor 50 for detecting a position of an upper surface of a document is disposed above the pickup roller 33.

The contact glass 25 includes a glass for automatic reading 25a and a glass for manually placed document 25b. Note that, the document conveying path d extends from the registration roller pair 36 as being curved so as to be reversed when arriving at the glass for automatic reading 25a. Further, on the document conveying path d, a plurality of sheet detection sensors including a sheet feeding sensor Sa and a discharge sensor Sb for detecting the presence/absence of a document or the passage of a document are disposed at suitable places.

Next, a sheet-through type document conveying operation using the document conveying device 27 is described. In the sheet-through system, when a copying start button of an operation panel (not shown) of the image forming apparatus 100 is pressed after a plurality of documents are set on the document feeding tray 29 with image surfaces faced up, a lift plate 45 raised by an elevation mechanism (not shown) pushes up the pickup roller 33 via the documents, and the weight of a frame (not shown) including the pickup roller 33 is applied to the lift plate 45. As a result, the upper surface of the document is pressed against the pickup roller 33 with a predetermined pressure (sheet feeding pressure).

Here, the pickup roller 33, the drive roller 44a, the driven roller 44b, and the sheet feeding belt 34 are disposed in the frame (not shown). Further, the pickup roller 33 is connected to the drive roller 44a via a gear (not shown). When the drive roller 44a is rotated by a roller drive motor (not shown), the sheet feeding belt 34 suspended across the drive roller 44a and the driven roller 44b is rotary-driven, and the pickup roller 33 is also rotary-driven.

Generally, a plurality of documents from the top of the documents set on the document feeding tray 29 are sent to a nip portion between the sheet feeding belt 34 and the separation roller 35 by the pickup roller 33. Then, only the uppermost one of the plurality of documents is separated by the separation roller 35 and is conveyed to the registration roller pair 36. At this time, after the document is conveyed by a predetermined distance after the leading edge of the document is detected by the sheet feeding sensor Sa, the rotary-drive of the pickup roller 33 and the sheet feeding belt 34 are stopped due to the stop of the operation of the roller drive motor, and thus, primary sheet feeding is completed. The leading edge of the document fed through the primary sheet feeding is stopped at a nip portion of the registration roller pair 36 under a state the document is warped.

After a lapse of a predetermined time period from the completion of the primary sheet feeding, secondary sheet feeding is started. Specifically, the registration roller pair 36 is rotary-driven due to the operation of a secondary sheet feeding drive motor (not shown). The document is conveyed to the discharge roller pair 43 through the glass for automatic reading 25a by the registration roller pair 36 and the conveying roller pairs 38 and 39, and then is finally discharged onto the document discharge tray 32 by the discharge roller pair 43. At this time, the completion of reading of an image of one document is detected when the discharge sensor Sb detects the passage of a trailing edge of the document.

Here, the discharge sensor Sb has a count function of counting the number of documents every time the conveyance of the documents is completed. When the sheet feeding sensor Sa detects a follow-on document, the second and the subsequent documents are continued to be conveyed in the same way as described above. Note that, when the document passes the glass for automatic reading 25a, the document is guided by a second conveyance guide (conveyance guide member) 71, and passes through a gap between a second reading guide (reading guide member) 73 and the glass for automatic reading 25a. In this manner, the document is conveyed while being lightly pressed against the glass for automatic reading 25a from above, and an image of the document is read by the image reading device 6 (see FIG. 1) through the glass for automatic reading 25a. Note that, details of the second conveyance guide 71 and the second reading guide 73 are described later.

Further, when reading a double-sided document, the following two-stage reading method may be used. That is, for example, after an image on a front surface of the document is read through the glass for automatic reading 25a, the document is distributed to the inversion tray 30 by branching hooks 47a, 47b, and 47c. Then, the inversion roller pair 42 is reversely rotated so that the document is conveyed again to an upstream side of the registration roller pair 36 under a state in which a back surface of the document is faced up. Then, an image on the back surface of the document is read through the glass for automatic reading 25a.

Note that, in the case of using the two-stage reading method, when documents after being read are successively discharged directly to the document discharge tray 32, the discharged documents are stacked with the front and back sides inverted with respect to the state at the time when the documents are set on the document feeding tray 29. Therefore, after the image of the back surface of the document is read through the glass for automatic reading 25a, the document is introduced onto the inversion tray 30 again by swinging the branching hooks 47a to 47c, and the document is discharged to the document discharge tray 32 via the conveying roller pair 40 and the discharge roller pair 43. With this structure, the front and back sides of each document are inverted again before the document is discharged, and hence the documents may be stacked on the document discharge tray 32 while keeping the state at the time when the documents are set on the document feeding tray 29.

Figure 3:
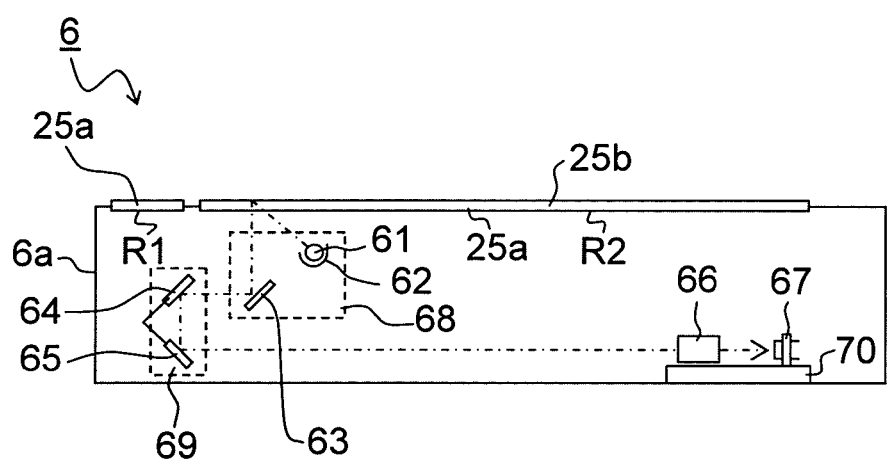
FIG. 3 is a sectional side view illustrating an internal structure of an image reading device, on which the document conveying device is placed, according to the embodiment of the present invention.

Next, the structure of the image reading device 6 for reading the image of the document as an electric signal is described. FIG. 3 is a sectional side view illustrating an internal structure of the image reading device, on which the document conveying device is placed, according to the embodiment of the present invention. In a frame 6a of the image reading device 6, there are disposed a lamp (light source) 61 for irradiating the image surface of the document with light, a reflective plate 62 for efficiently providing light from the lamp 61 to the image surface of the document, a first mirror 63 for directly receiving light reflected from the document and reflecting the light, a second mirror 64 for receiving light reflected from the first mirror 63 and reflecting the light, and a third mirror 65 for receiving light reflected from the second mirror 64 and reflecting the light.

Further, on a base plate 70, there are disposed a lens barrel 66 holding a lens unit (not shown) for introducing and condensing light reflected from the third mirror 65, and a line-type CCD (photoelectric conversion member) sensor (image reading portion) 67 including a photoelectric conversion element which receives light, which is reflected from the document and condensed by the lens unit of the lens barrel 66, and converts the light into an electric signal. Note that, an optical path of the light reflected from the document is indicated by an alternate long and short dashed line.

Here, the lamp 61, the reflective plate 62, and the first mirror 63 are fixed integrally on a first carriage 68, and further, the second mirror 64 and the third mirror 65 are fixed integrally on a second carriage 69. The first carriage 68 and the second carriage 69 constitute scanning means and are capable of reciprocating in cooperation with each other although being independent from each other.

More specifically, when the reading operation of the document image is performed in the above-mentioned sheet-through system, the first carriage 68 is moved to an area immediately below a first image reading region (image reading region) R1 of the glass for automatic reading 25a to be held, and the second carriage 69 is held at a predetermined position. On the other hand, in the document fixing system, the first carriage 68 and the second carriage 69 reciprocate (move for scanning) below a second image reading region R2 of the glass for manually placed document 25b while mutually maintaining an optical path length of the light reflected from the document to be constant. Further, the first carriage 68 and the second carriage 69 are driven by a carriage drive motor (not shown).

With such a structure, the light reflected from the document, which is emitted from the lamp 61 and reflected from the image surface of the document, is reflected by the first mirror 63 to the third mirror 65 to be introduced into the lens unit in the lens barrel 66, and is condensed by the lens unit, to thereby form an image on the CCD sensor 67. Then, the light is subjected to photoelectric conversion processing by the CCD sensor 67, and the document image is read as an electric signal.

Figure 4:
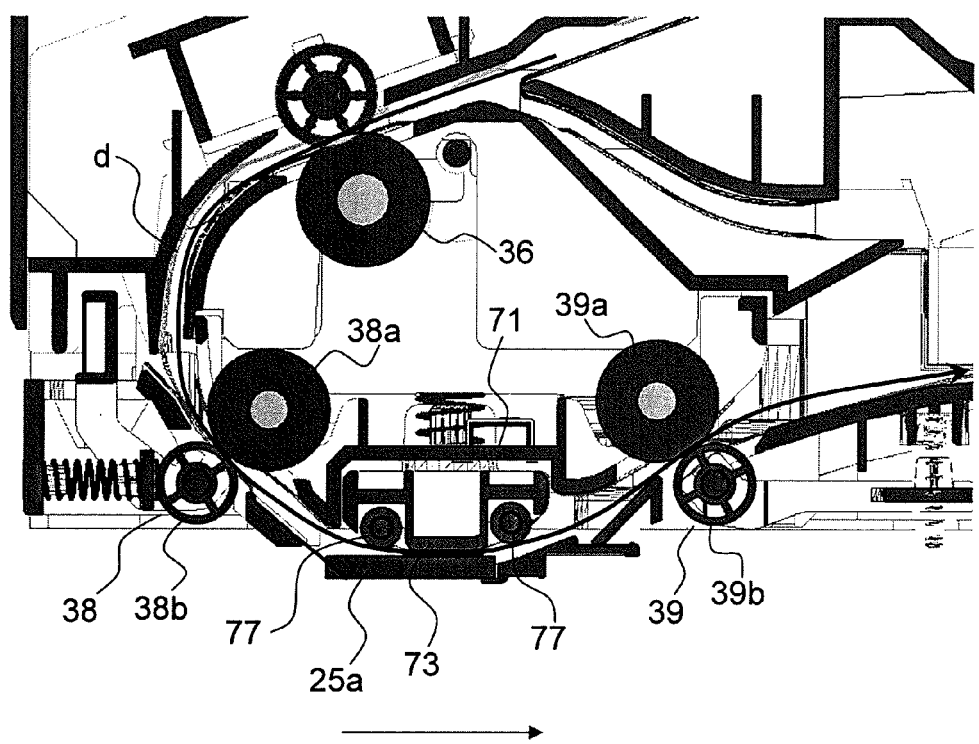
FIG. 4 is a sectional side view illustrating a structure around a second conveyance guide and a second reading guide.
Figure 5:
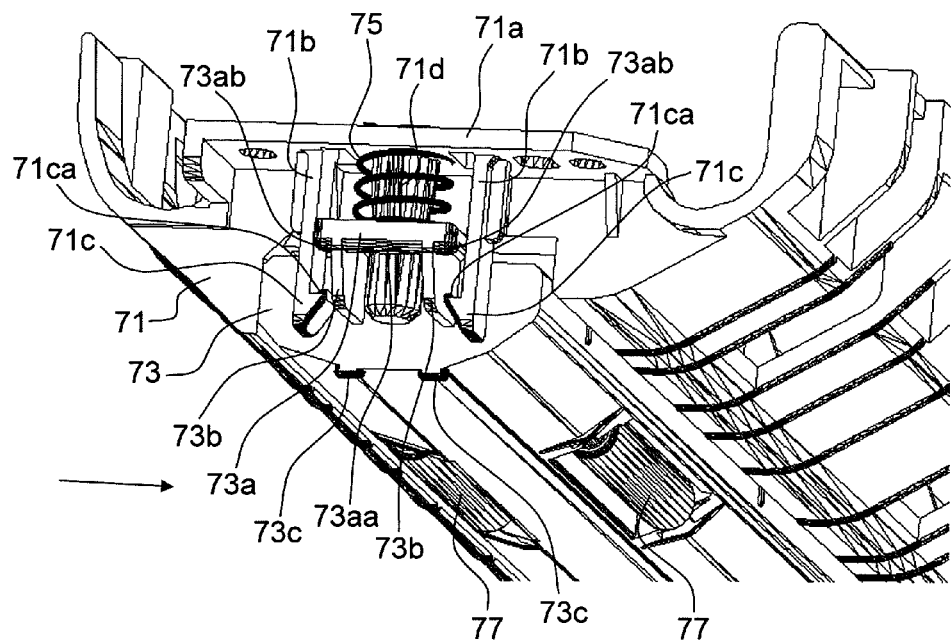
FIG. 5 is a perspective view illustrating a support state of the second reading guide with respect to the second conveyance guide.
Figure 6:
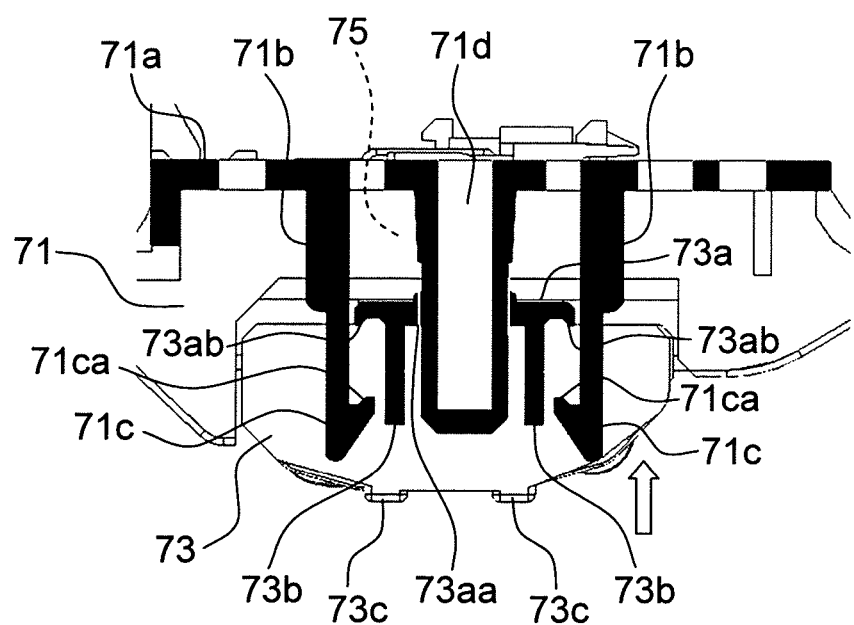
FIG. 6 is a sectional side view illustrating an arrangement state of the second conveyance guide and the second reading guide when the document conveying device is closed.
Figure 7:
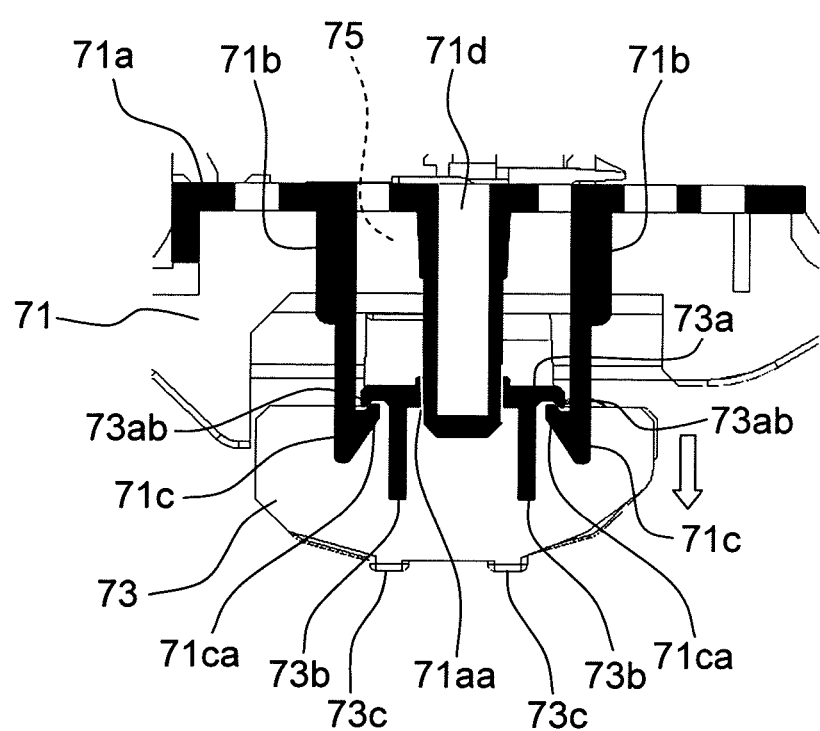
FIG. 7 is a sectional side view illustrating an arrangement state of the second conveyance guide and the second reading guide when the document conveying device is opened.
Figure 8:
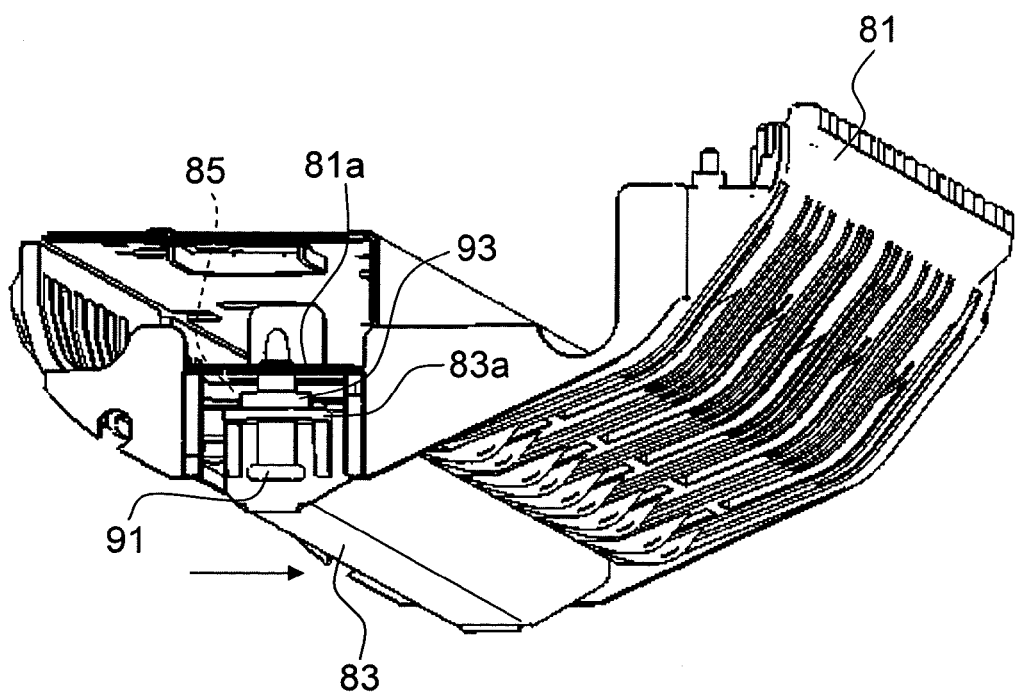
FIG. 8 is a perspective view illustrating a support state of a conventional first reading guide with respect to a conventional first conveyance guide.

FIG. 4 is a sectional side view illustrating a structure around the second conveyance guide and the second reading guide. FIG. 5 is a perspective view illustrating a support state of the second reading guide with respect to the second conveyance guide. FIG. 6 is a sectional side view illustrating an arrangement state of the second conveyance guide and the second reading guide when the document conveying device is closed. FIG. 7 is a sectional side view illustrating an arrangement state of the second conveyance guide and the second reading guide when the document conveying device is opened. Portions in common to those of FIG. 2 are denoted by the same reference symbols in the figures, and description thereof is omitted.

As illustrated in FIG. 4, at an end portion of the second conveyance guide 71 on an upstream side in the document conveying direction (direction indicated by the arrow of FIG. 4), a drive roller 38a constituting the conveying roller pair 38 is disposed. At an end portion thereof on a downstream side, a drive roller 39a constituting the conveying roller pair 39 is disposed. Further, a driven roller 38b is brought into pressure contact with the drive roller 38a, and a driven roller 39b is brought into pressure contact with the drive roller 39a.

A central portion in the document conveying direction of a lower end portion of the second conveyance guide 71 is recessed upward along a front-and-back direction (width direction of the document, direction perpendicular to the paper plane of FIG. 4) of the device main body. In this recessed portion, the second reading guide 73 is disposed along the second conveyance guide 71 (width direction). Further, on the upstream side and the downstream side with respect to a lower surface of the second reading guide 73, follower rollers 77 are provided, respectively.

The document which has been conveyed from the registration roller pair 36 is conveyed through the document conveying path d by the conveying roller pair 38, is guided to a portion of the second conveyance guide 71 on the upstream side, and is guided to the follower roller 77 on the upstream side of the second reading guide 73. Then, the document passes through a gap formed between the lower surface of the second reading guide 73 and the glass for automatic reading 25a. After passing through the gap, the document is guided to the follower roller 77 on the downstream side and a portion of the second conveyance guide 71 on the downstream side, and then is conveyed to the discharge roller pair 43 (see FIG. 2) by the conveying roller pair 39.

As illustrated in FIG. 5, at an end portion of the second conveyance guide 71 on a front surface side (front side of FIG. 5) and above the second reading guide 73, a plate-like second support portion (support portion) 71a is formed so as to protrude therefrom to the front surface side along the document conveying direction (direction indicated by the arrow of FIG. 5). On the second support portion 71a, two elastic portions 71b, which are each made of an elastic material, are formed along the document conveying direction so as to protrude downward.

The elastic portions 71b are formed at positions sandwiching a second protruding portion 73a described later. At a tip end of each of the elastic portions 71b, a claw portion 71c is formed, which protrudes to an inner side between the elastic portions 71b and is sharpened toward the lower end. Further, in each of the claw portions 71c, a first inclined portion 71ca is provided so as to protrude therefrom, the first inclined portion 71ca inclining upward toward the inner side. Further, in a region of the second support portion 71a between the elastic portions 71b, a substantially cylindrical guide portion 71d protruding downward is formed.

Meanwhile, at an end portion of the second reading guide 73 on the front surface side, in a position sandwiched between the two elastic portions 71b and below the support portion 71a of the second conveyance guide 71, the plate-like second protruding portion (protruding portion) 73a protruding to the front surface side along the document conveying direction is formed. Both end portions of the second protruding portion 73a in the document conveying direction are slidable with respect to the elastic portions 71b. In the second protruding portion 73a, a through hole 73aa is formed so that the guide portion 71d passes therethrough in a slidable manner. In this manner, the second protruding portion 73a is slidably sandwiched by the elastic portions 71b while being guided by the guide portion 71d. Note that, the second protruding portion 73a is guided by the sliding of the guide portion 71d through the through hole 73aa, and hence the second protruding portion 73a may also be configured to be movably sandwiched without sliding with respect to the elastic portions 71b.

Further, when the both end portions of the second protruding portion 73a in the document conveying direction press the claw portions 71c from below, the both end portions press the claw portions 71c to the outer sides, and hence the elastic portions 71b are warped due to the pressure. As a result, the second protruding portion 73a is disposed above the claw portions 71c, and after the second protruding portion 73a is disposed above the claw portions 71c, downward movement of the second protruding portion 73a is regulated by the claw portions 71c. As described above, the second protruding portion 73a is engaged with the elastic portions 71b by snap-fitting.

Note that, when the second protruding portion 73a is disposed above the claw portions 71c, the second protruding portion 73a is slidably sandwiched by the elastic portions 71b as described above. Further, at each end portion of the second protruding portion 73a, which slides with respect to the elastic portion 71b, a second inclined portion 73ab which is capable of engaging with the first inclined portion 71ca is provided so as to protrude downward therefrom. When the second protruding portion 73a is brought into abutting contact with the claw portions 71c from above, the first inclined portions 71ca and the second inclined portions 73ab are engaged with each other.

On the second protruding portion 73a, reinforcement portions 73b are provided so as to protrude downward therefrom. The reinforcement portions 73b are provided so as to protrude downward from the second protruding portion 73a, and are also provided so as to protrude from the end portion of the second reading guide 73 on the front surface side to the front surface side. With this structure, durability of the second protruding portion 73a against impact which occurs when the second protruding portion 73a is engaged with the claw portions 71c may be improved.

Further, between the second support portion 71a and the second protruding portion 73a, a second coil spring (bias member) 75 is disposed so as to surround a peripheral surface of the guide portion 71d along the up-and-down direction. By the second coil spring 75, the second protruding portion 73a is biased to the second support portion 71a in a direction (downward) separating from the second support portion 71a. A biasing force of the second coil spring 75 is set so that, when the document conveying device 27 is opened with respect to the contact glass 25 (see FIG. 1), the second protruding portion 73a is engaged with the claw portions 71c and the downward movement thereof is regulated, and when the document conveying device 27 is closed, the second reading guide 73 and the second conveyance guide 71 are not brought into abutting contact with each other in the up-and-down direction.

Further, at end portions on the lower surface of the second reading guide 73 on the front surface side and the back surface side, protruding portions 73c are provided so as to protrude downward therefrom. With this, when the document conveying device 27 is closed with respect to the contact glass 25, the protruding portions 73c and the glass for automatic reading 25a are brought into abutting contact with each other, and a gap provided between the lower surface of the second reading guide 73 and the glass for automatic reading 25a (see FIG. 4) may be maintained constant.

Note that, at the end portion of the second reading guide 73 on the back surface side, an engagement protrusion (not shown) is formed, and the engagement protrusion engages with (is hook on) an engagement hole (not shown) which is formed at the end portion of the second conveyance guide 71 on the back surface side. In this engagement state, the engagement protrusion is movable with respect to the engagement hole in the up-and-down direction, and is biased in a direction separating from the engagement portion by a coil spring (not shown).

Next, an assembly operation of the second reading guide 73 with respect to the second conveyance guide 71 is described. First, the above-mentioned engagement protrusion (not shown), which is formed at the end portion of the second reading guide 73 on the back surface side, is engaged with the above-mentioned engagement hole (not shown), which is formed in the second conveyance guide 71.

Then, the second coil spring 75 is inserted into the guide portion 71d so as to surround the peripheral surface thereof, and the end portion of the second reading guide 73 on the front surface side is moved upward from the lower side of the end portion of the second conveyance guide 71 on the front surface side. Then, the second protruding portion 73a is engaged with the elastic portions 71b by snap-fitting, and the guide portion 71d is caused to pass through the through hole 73aa of the second protruding portion 73a. In this manner, the second protruding portion 73a is slidably sandwiched by the elastic portions 71b, and the second reading guide 73 is slidably fixed to the second conveyance guide 71. Thus, the second reading guide 73 may be assembled with respect to the second conveyance guide 71.

Next, an operation of the second reading guide 73 with respect to the second conveyance guide 71 after the assembly is described. FIG. 6 is a sectional side view illustrating an arrangement state of the second conveyance guide and the second reading guide when the document conveying device is closed. FIG. 7 is a sectional side view illustrating an arrangement state of the second conveyance guide and the second reading guide when the document conveying device is opened. Portions in common to those of FIG. 5 are denoted by the same reference symbols in the figures, and description thereof is omitted.

As illustrated in FIG. 6, when the document conveying device 27 (see FIG. 1) is closed, the protruding portions 73c are brought into abutting contact with the glass for automatic reading 25a (see FIG. 4), and the downward movement of the second reading guide 73 is regulated. At this time, the second reading guide 73 and the second conveyance guide 71 come close to each other in the up-and-down direction, and hence the second protruding portion 73a is disposed below the second support portion 71a and above the claw portions 71c.

On the other hand, as illustrated in FIG. 7, when the document conveying device 27 (see FIG. 1) is opened, the second reading guide 73 moves downward because of the biasing force of the second coil spring 75 and own weight of the second reading guide 73. However, the second protruding portion 73a is engaged with the claw portions 71c, and hence the downward movement of the second reading guide 73 is regulated. At this time, the second inclined portions 73ab of the second protruding portion 73a and the first inclined portions 71ca of the claw portions 71c are engaged with each other, and hence the downward movement of the second reading guide 73 is further reliably regulated.

Here, when the document conveying device 27 is opened with respect to the contact glass 25 for a long period of time, because of the own weight of the second reading guide 73 and the biasing force of the second coil spring 75, each of the tip ends of the elastic portions 71b is liable to warp to a side opposite to the second protruding portion 73a (outer side in the left-and-right direction of FIG. 7). Further, when the opening and closing of the document conveying device 27 is repeated over time, the engagement and the release of the engagement between the second protruding portion 73a and the claw portions 71c are repeated, and hence every time the elastic portions 71b receive the impact at the time of engagement, the elastic portions 71b are liable to warp to the sides opposite to the second protruding portion 73a.

With regard to this point, in this embodiment, when the document conveying device 27 is opened, the second inclined portions 73ab of the second protruding portion 73a are engaged with the first inclined portions 71ca of the claw portions 71c, and hence it is possible to prevent warping of the elastic portions 71b to the sides opposite to the second protruding portion 73a.

As described above, there are provided the second protruding portion 73a protruding outward from the end portion of the second reading guide 73 on the front surface side and the second support portion 71a protruding outward from the second conveyance guide 71 along the front surface side above the second protruding portion 73a. In the second support portion 71a, the elastic portions 71b are formed. The elastic portions 71b protruding downward sandwich the second protruding portion 73a so that the second protruding portion 73a is movable in the up-and-down direction. At the tip end of each of the elastic portions 71b, the claw portion 71c is formed, with which the second protruding portion 73a is engaged from below by snap-fitting, and which is capable of regulating the downward movement of the second protruding portion 73a. Therefore, without using other members, only by engaging the second protruding portion 73a with the elastic portions 71b along the up-and-down direction, the second reading guide 73 may be supported by the second conveyance guide 71. Accordingly, it is possible to reduce the number of parts and achieve labor saving during assembly.

Note that, here, the second protruding portion 73a and second support portion 71a are provided on only the front surface side of the second reading guide 73 and on the front surface side of the second conveyance guide 71, respectively. However, when the second protruding portion 73a and the second support portion 71a are provided at at least one end portion of the second reading guide 73 and at at least one end portion of the second conveyance guide 71 in the width direction of the document, respectively, it is possible to movably fix the second reading guide 73 with respect to the second conveyance guide 71. Therefore, besides the above, the second protruding portion 73a and the second support portion 71a may be provided on the back surface side of the second reading guide 73 and on the back surface side of the second conveyance guide 71, respectively. Further, each of the second protruding portion 73a and the second support portion 71a may be provided on both the front surface side and the back surface side of the second reading guide 73 or the second conveyance guide 71.

Further, in this embodiment, the first inclined portions 71ca are provided in the claw portions 71c so as to protrude upward therefrom, and the second inclined portions 73ab, which are engagable with the first inclined portions 71ca, are provided at both end portions of the second protruding portion 73a facing the claw portions 71c, so as to protrude therefrom. Therefore, even when the opening and closing operation of the document conveying device 27 is repeated for a long period or the document conveying device 27 is opened for a long period of time, it is possible to prevent the elastic portions 71b from warping to the sides opposite to the second protruding portion 73a.

With this, it is possible to prevent disengaging of the second protruding portion 73a from the claw portions 71c, and also it is possible to prevent occurrence of detachment over time and the like. However, shapes of the claw portions 71c and the second protruding portion 73a are not particularly limited as long as the claw portions 71c and the second protruding portion 73a are engagable with each other to enable regulation of the downward movement of the second protruding portion 73a. Therefore, it is possible to omit the first inclined portions 71ca and the second inclined portions 73ab.

Further, in this embodiment, on the second support portion 71a, the guide portion 71d which protrudes downward from between the elastic portions 71b is formed, and in the second protruding portion 73a, the through hole 73aa through which the guide portion 71d is sliadably passed is formed. Further, between the second support portion 71a and the second protruding portion 73a, the second coil spring 75 for biasing the second protruding portion 73a in the direction separating from the second support portion 71a is provided. Therefore, with an easier structure, the second reading guide 73 may be guided with respect to the second conveyance guide 71 in the up-and-down direction. Accordingly, it is possible to further prevent the elastic portions 71b from warping.

Note that, when the second protruding portion 73a is slidable with respect to the elastic portions 71b, it is also possible to omit the guide portion 71d and the through hole 73aa. Further, it is also possible to omit the second coil spring 75. In this case, when the document conveying device 27 is closed, the second conveyance guide 71 and the second reading guide 73 are brought into abutting contact with each other in the up-and-down direction, and when the document conveying device 27 is opened, the second reading guide 73 moves downward with respect to the second conveyance guide 71 due to its own weight, and the second protruding portion 73a and the claw portions 71c engage with each other.

Further, the arrangement of the second coil spring 75 is not particularly limited as long as the second coil spring 75 is capable of biasing the second reading guide 73 in the direction separating from the second conveyance guide 71. Further, in place of the second coil spring 75, other members such as a tension spring may be used as long as it is possible to bias the second reading guide 73 in the direction separating from the second conveyance guide 71.

Moreover, the present invention is not limited to the embodiment described above, and various modifications may be made without departing from the gist of the present invention. For example, the shapes of the second support portion 71*a* and the second protruding portion 73*a* used in the above-mentioned embodiment are not particularly limited, and it is possible to appropriately set those shapes depending on the apparatus structure and the like. For example, in the above-mentioned embodiment, the reinforcement portions 73*b* are formed on the second protruding portion 73*a*, but if necessary, a reinforcement portion may be formed on the second support portion 71*a*, or another reinforcement portion may be formed on the second protruding portion 73*a*.

Further, in the above-mentioned embodiment, as the image reading device 6, the pickup roller 33 and the sheet feeding belt 34 are used as a unit, but the pickup roller 33 and the sheet feeding belt 34 may be separately provided. Further, it is possible to employ a structure in which a sheet feeding roller is disposed in place of the sheet feeding belt 34, or a structure in which a separation pad is disposed in place of the separation roller 35.

What is claimed is:

1. A document conveying device, comprising:
    a conveyance guide member which is capable of being opened upward and closed with respect to a contact glass, is disposed facing the contact glass along a conveying direction of a document, and guides the document to an upper surface of the contact glass;
    a reading guide member which is disposed along a width direction of the document, is movably supported in an up-and-down direction with respect to the conveyance guide member, and guides the document to a position facing an image reading region in the upper surface of the contact glass;
    a protruding portion which protrudes outward from at least one end portion of the reading guide member in the width direction;
    a support portion which protrudes outward from the conveyance guide member along the width direction above the protruding portion; and
    elastic portions which protrude downward from the support portion and sandwich the protruding portion so that the protruding portion is movable in the up-and-down direction, each of the elastic portions having a tip end including a claw portion which engages with the protruding portion by snap-fitting so as to enable regulation of downward movement of the protruding portion, wherein:
    the support portion includes a guide portion formed thereon, the guide protruding downward between the elastic portions,
    the protruding portion has a through hole through which the guide portion passes in a slidable manner, and
    the document conveying device further comprises a bias member, provided between the support portion and the protruding portion, which biases the protruding portion in a direction separating from the support portion.

2. A document conveying device according to claim 1, wherein:
    each claw portion has a first inclined portion which protrudes upward from the claw portion; and
    the protruding portion has an end portion facing each claw portion, each end portion having a second inclined portion which protrudes therefrom so as to be engagable with the first inclined portion.

3. A document conveying device according to claim 1, further comprising a reinforcement portion which is provided on the protruding portion so as to protrude downward from the protruding portion and is provided on a side end portion of the reading guide member so as to protrude from the reading guide member.

4. An image reading device comprising the document conveying device according to claim 1.

5. An image forming apparatus comprising the image reading device according to claim 4.

* * * * *